United States Patent [19]

Farris et al.

[11] 4,432,302
[45] Feb. 21, 1984

[54] RESIN IMPREGNATION RING

[75] Inventors: John R. Farris, Long Beach; Allan T. Tucci, Orange, both of Calif.

[73] Assignee: McDonnell Douglas Corporation, Long Beach, Calif.

[21] Appl. No.: 374,984

[22] Filed: May 5, 1982

[51] Int. Cl.³ .............................................. B05C 5/02
[52] U.S. Cl. .................................... 118/410; 118/420; 118/DIG. 19
[58] Field of Search ............... 118/410, 411, 407, 420, 118/428, DIG. 19, DIG. 22; 87/23; 28/142, 28/143; 156/431

[56] References Cited

U.S. PATENT DOCUMENTS

| | | | |
|---|---|---|---|
| 1,968,687 | 7/1934 | Johnson | 118/420 X |
| 2,373,078 | 4/1945 | Kleist | 118/420 X |
| 2,477,422 | 7/1949 | Roseman | 118/78 X |
| 2,782,563 | 2/1957 | Russell | 118/78 X |
| 2,909,151 | 10/1959 | Kahn | 118/420 X |
| 2,976,177 | 3/1961 | Warthen | 118/78 X |
| 3,081,947 | 3/1963 | Walter | 118/317 X |
| 3,117,888 | 1/1964 | Fox | 118/234 X |
| 3,157,536 | 11/1964 | Caines | 118/234 X |
| 3,172,780 | 3/1965 | Csok et al. | 118/325 X |
| 3,190,259 | 6/1965 | Craig et al. | 118/411 X |
| 3,201,298 | 8/1965 | Baker et al. | 156/431 |
| 3,268,312 | 8/1966 | Grant | 118/234 X |
| 3,271,800 | 9/1966 | Allard | 118/410 X |
| 3,378,427 | 4/1968 | McClean | 156/431 |
| 3,827,397 | 8/1974 | Hebberling et al. | 118/234 X |
| 3,862,853 | 1/1975 | Benson | 118/234 X |
| 3,978,695 | 9/1976 | Hürzler et al. | 118/325 X |
| 4,165,603 | 8/1979 | Lattion | 118/78 X |
| 4,193,372 | 3/1980 | Eckholt | 118/78 X |

FOREIGN PATENT DOCUMENTS 208881 7/1955 Australia .............................. 118/234

Primary Examiner—John P. McIntosh
Attorney, Agent, or Firm—John P. Scholl; Donald L. Royer; George W. Finch

[57] ABSTRACT

A hollow impregnation ring for coating fibers with a binder, the ring having a slot thru which the binder flows onto the fibers. The pressure of said binder within said ring controlling a seal and the flow of said binder from said slot.

3 Claims, 6 Drawing Figures

RESIN IMPREGNATION RING

BACKGROUND OF THE INVENTION

Hollow composite structures have been manufactured by braiding or winding fibers, filaments or tapes (hereinafter fibers) on mandrels. The fibers are coated with resin or other binders by dip tanks, spraying or other coating methods.

The coating devices and methods used in the past have not produced consistant quality structures because the coatings applied were not uniform. The poor quality was particularly evident when the fibers were moving or rotating about the mandrel in a braiding or winding application.

To overcome the deficiencies of the prior art coating methods and devices, the inventive impregnation ring was designed for a uniform application of resin or binder to the fibers. The inventive impregnation ring can coat roving fibers received from any point on its 360° circumference. The inventive ring can accommodate hot melt thermoplastic and thermoset resin systems as well as resin systems contained in solvents.

The impregnation ring is hollow and has a circumferential slot for resin distribution. A ring shaped elastomeric or steel gasket, located inside the hollow impregnation ring, controls the slot opening. If a large amount of resin is necessary, two or more impregnation rings may be used to coat the fibers. In the preferred embodiment as depicted therein, the resin pressure in hollow ring controls the position of the ring shaped gasket located within the impregnation ring and its engagement of the circumferential slot. The slot opening controls the flow of the resin from the ring onto the fibers which are drawn across the slot for coating.

In cases where the mandrel rotates and the fibers follow a fixed path, the impregnation ring can have a discontinuous or segmented slot. The inner ring shaped gasket seal may be segmented or continuous and seal the segmented slots. This segmented ring will allow resin to be delivered only in that portion of the 360° pattern where fibers cross the ring.

The segmented slot openings could be adjustable and indexed for different fiber winding requirements.

DESCRIPTION OF THE PREFERRED EMBODIMENT

Figure 1:
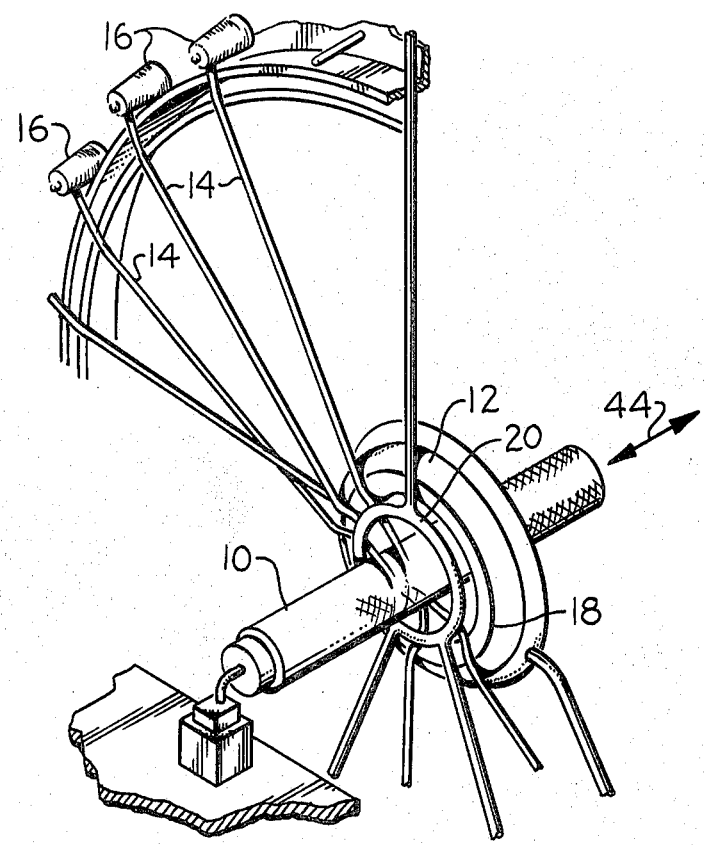
FIG. 1 is a partial view of a cylindrical mandrel being braided with fibers which are coated by the inventive impregnation ring.

In FIG. 1 a mandrel 10 is being passed through an impregnation ring 12 and fibers 14 are being braided onto the mandrel 10. The fibers 14 are supplied from spools 16. The spools are rotated in a roving pattern about the circumference of the impregnation ring 12 by a well-known braiding mechanism. The fibers 14 are passed across the circumferential slot 18 in the impregnation ring 12 and are coated with resin. The fibers 14 are held against the impregnation ring 12 by a guide ring 20. If a larger amount of resin is necessary to coat the fibers, due to the speed at which the coating is taking place or the size or configuration of the fibers, a second resin impregnation ring may be substituted for the guide ring. In this configuration the slots of the resin impregnation rings may be facing each other and the fibers would pass between them. When multiple impregnation rings are used, the rings may be of different sizes to provide better and more efficient wetting of the fibers with the resin.

The methods and apparatus for winding or braiding of the fibers and their movement in a circumferential roving pattern about the mandrel is well-known and the detailed mechanism for such movement is therefore not shown.

Figure 2:
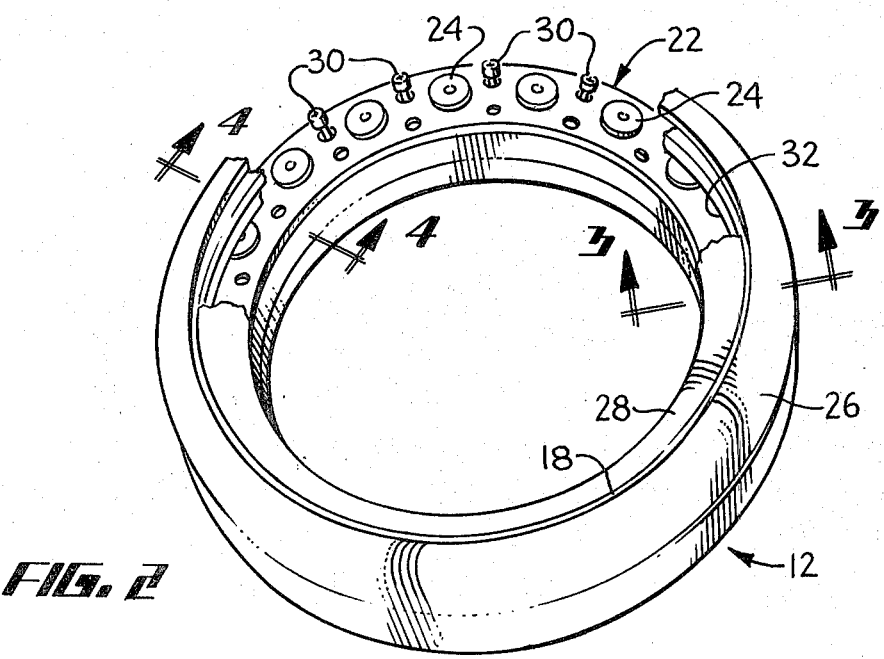
FIG. 2 is a cut away view of the inventive impregnation ring showing its various components.
Figure 4:
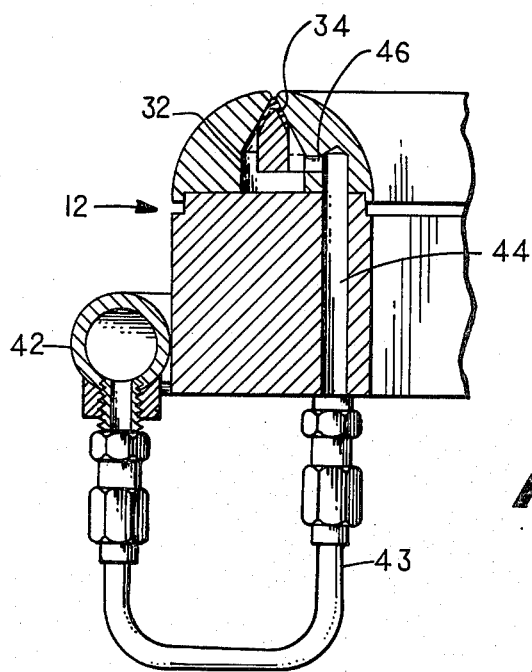
FIG. 4 is a section view along the line 4—4 of FIG. 2 showing a resin manifold and supply system.

FIG. 2 shows the impregnation ring 12 which is comprised of a base 22 having spring loaded pistons 24 therein. An outer ring 26 and an inner ring 28 are held to the base by bolts 30 (some of which are shown). When the impregnation ring 12 is assembled by bolting the inner and outer rings onto the base a circumferential slot 18 or groove is formed between the rings. The assembled impregnation ring forms a circumferential passage 32 (FIG. 4) for the distribution of the resin to the slot 18.

Figure 3:
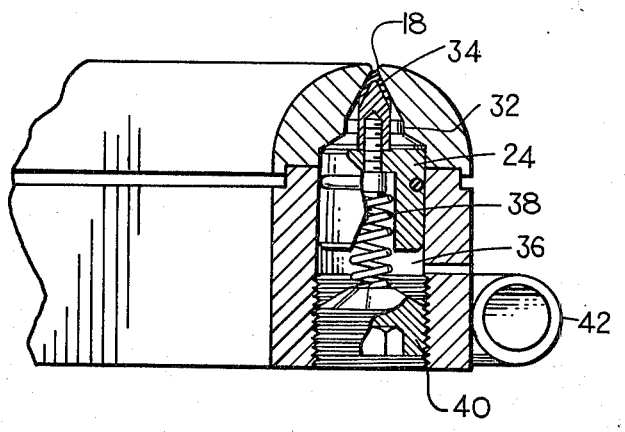
FIG. 3 is a section view along the line 3—3 of FIG. 2 showing the internal spring loaded pistons forcing the ring-shaped gasket into the circumferential slot to close off the flow of the resin. In addition, a resin manifold ring has been added.

Within the circumferential passage 32 is a circumferential gasket or seal 34 which is bolted to the movable spring loaded pistons 24 (FIG. 3). The pistons 24 are contained in cylindrical ducts 36 in the base and are forced upward (FIG. 3) by coil springs 38. The coil springs 38 are compressed between the pistons 24 and the threaded plugs 40 located in the cylindrical ducts 36. The compression of the coil springs 38 is adjusted by moving the threaded plugs 40. At the top of the travel of the spring loaded pistons 24 the circumferential seal 34 is forced into and closes the circumferential slot 18.

Surrounding the resin impregnation ring 12 is a distribution manifold 42 which feeds resin by tubes 43 and ducts 44 and 46 (FIG. 4) into the interior passage 32 of the ring.

When there is no pressure on the resin in the distribution system the coil springs 38 hold the circumferential seal 34 in the slot 18 shutting off the flow of any resin. As the pressure of the resin within the system increases pistons 24 are forced downward in FIG. 2 against the compression of the coil springs 38. With downward movement of the pistons 24 the seal 34 moves out of the circumferential slot 18 permitting the resin to flow through the slot 18 and onto any fibers 14 passing across such slot 18.

The inventive resin system may be used with hot melt resin by merely installing a conventional heater either adjacent the ring, within the base, or within the hollow interior of the ring. Such electrical heating elements are well-known and their operation is conventional.

The movement of the circumferential seal into and out of the slot may be also controlled by hydraulic, spring or electrical actuators.

Figure 5:
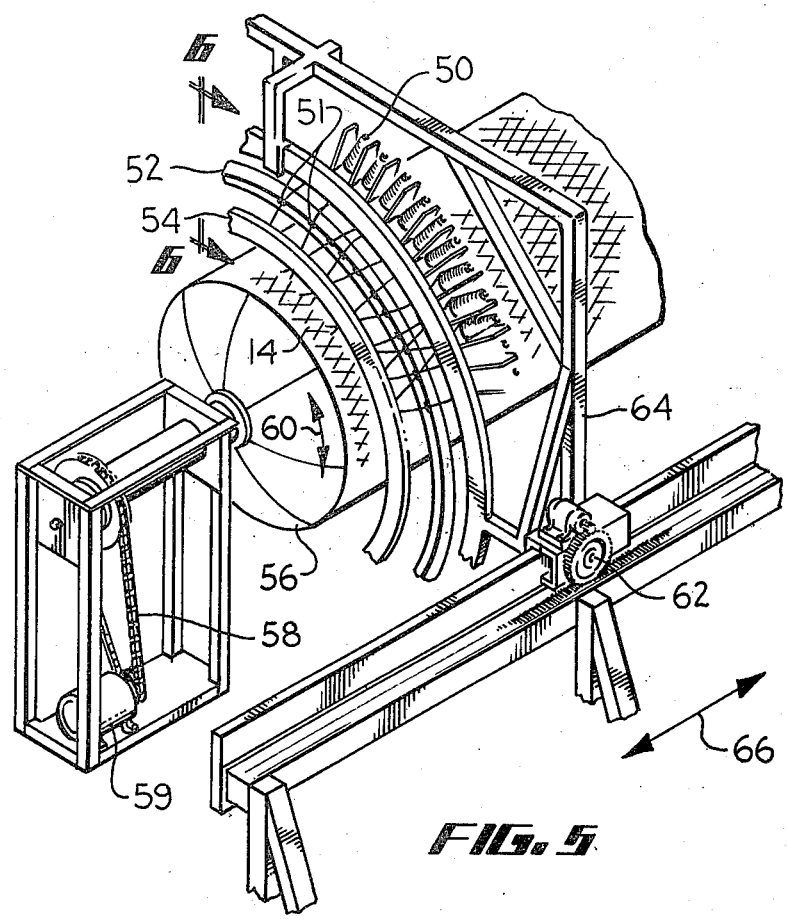
FIG. 5 depicts a winding machine wherein the mandrel can rotate and the resin impregnation ring has slotted openings.

In FIG. 5 the filament spools 50 are stationary and the fibers 14 pass across the openings 51 in the slotted impregnation ring 52. The guide ring 54 has pins 55 on its surface FIG. 6 to keep the fibers 14 following across the opening 51 in the slotted impregnation ring 52. The mandrel 56 is rotated in either direction of double-ended arrow 60 by chain drive 58 attached to motor 59 to wind the fibers 14 on to the mandrel 56. A rack and pinion drive 62 can move the spool assembly 64 in a longitudinal direction of double-ended arrow 66 to assist in laying the fibers 14 on the mandrel 56.

In operation fibers 14 are pulled from the spools 16, FIG. 1 and threaded between the guide ring 20 and the impregnation ring 12 across the slot 18 and onto the mandrel 10. The conventional braiding mechanism is turned on and the spools 16 rotate about the circumference of the mandrel 10. The mandrel 10 is moved in a longitudinal direction, as indicated by double ended arrows 44 and the fibers 14 are laid onto the mandrel 10. The resin pressure is then increased within the impregnation ring 12 and the circumferential seal 34 moves out of the slot 18 and resin flows from the slot 18 onto the fibers 14.

When the winding or braiding operation is complete resin pressure is reduced and the circumferential seal moves into the groove shutting off the flow of the resin.

Figure 6:
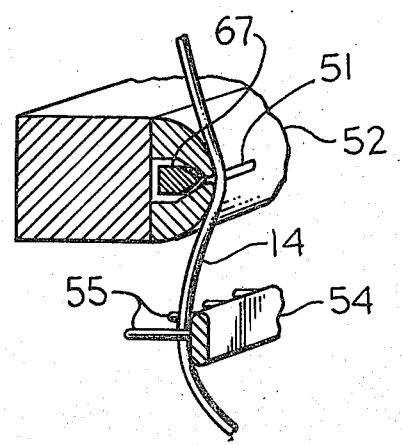
FIG. 6 is an enlarged view along the section 6—6 of FIG. 5 showing the fibers passing across the slotted impregnation ring and thru a guide ring.

The winding operation of the driver of FIGS. 5 and 6 operate in a similar manner. The resin pressure is turned up in the system and circumferential seal 67 moves out of openings 51 permitting the resin to wet the fibers 14 as they are drawn across the openings. The winding machine is turned on and fibers 14 are laid up on the mandrel 56. When the winding is complete the resin is reduced and seal 67 closes off openings 51 stopping the flow of the resin. The winding machine is then shut down.

While certain exemplary embodiments of this invention have been described and shown in the accompanying drawings, it is to be understood that such embodiments are merely illustrative of, and not restrictive on, the broad invention to the specific desire to be limited in my invention to the specific constructions or arrangements shown and described, since various other obvious modifications may occur to persons having ordinary skill in the art.

What is claimed is:

1. An impregnation device for coating roving fibers with a binder comprising:
    a hollow 360° ring for distribution of said binder under pressure, said ring having a continuous circumferential slot along said ring;
    a circular seal located within said hollow ring to engage and close said slot;
    spring bias means located within said hollow ring and contacting said seal to force said seal into engagement with said slot; and means to supply binder under different pressures to said hollow ring said binder forcing said seal out of engagement with said slot at a higher pressure permitting said binder to flow through said slot from said ring onto the roving fibers.

2. The impregnation device of claim 1 wherein said spring biased means comprises:
    pistons to engage said circular seal; and
    coil springs engaging said pistons and said hollow ring to bias said pistons and in turn said seal into engagement with said slot.

3. The impregnation device of claim 2 having coil springs with adjustable compressive force said adjustment provided by threaded plugs in said hollow ring engaging said coil springs, said movable plugs permitting adjustment of the compression of said coil spring and in turn the pressure of said pistons on said seal and said seal in said slot.

* * * * *